Sept. 25, 1923.
W. OLCOTT
1,469,102
PROTECTIVE SHIELD FOR AUTOMOBILE DRIVERS
Filed Dec. 5, 1922
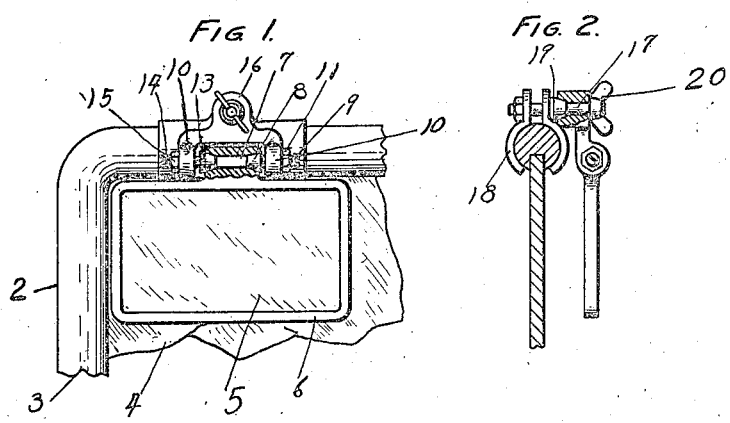
INVENTOR
Walter Olcott
ATTORNEY Patented Sept. 25, 1923.

1,469,102

UNITED STATES PATENT OFFICE.

WALTER OLCOTT, OF SOUTH MANCHESTER, CONNECTICUT.

PROTECTIVE SHIELD FOR AUTOMOBILE DRIVERS.

Application filed December 5, 1922. Serial No. 605,015.

*To all whom it may concern:*

Be it known that WALTER OLCOTT, citizen of the United States, residing at South Manchester, in the county of Hartford and State of Connecticut, has invented certain new and useful Improvements in Protective Shields for Automobile Drivers, of which the following is a specification.

This invention relates to a protective shield for an automobile driver. At the present time, accidents are quite frequently caused in automobile traffic due to the brightness of the glare of a headlight of an approaching car. I provide means by which these glaring lights can be so modified, as not to affect the vision of the chauffeur of an automobile. I provide a shield which is usually in advance of the driver of an auto, which will check or modify the rays of a lamp on an approaching car in such manner as not to affect even remotely, the driver of the car equipped with the shield, although such driver can through the shield readily see the approaching car. The device is capable of wide modification although desirably it is supported upon the wind shield of an automobile in such manner that it can be swung easily to or from operative relation, being when in operative relation in the line of vision of the chauffeur.

In the drawing accompanying and forming part of the present specification I have shown somewhat fully one of the many different forms of embodiment of the invention which will be set forth fully in the following description. Clearly, I am not restricted to such disclosure. I may depart therefrom in many respects within the scope of the invention defined by the claims following said description.

Referring to said drawings:

Figure 1 is an inside face view of the left portion of the wind shield of an automobile, equipped with a device involving the invention.

Fig. 2 is a cross section of the same.

It is the custom to equip an automobile with a windshield such as is partly represented and which is denoted in a general way by 2. This windshield involves in its organization a practically rectangular frame 3 in which is mounted a sheet of glass or similar translucent material as 4. In said Fig. 1, I have shown but a portion of the wind shield 2 generally its left side as viewed from the seat of the driver.

The light shield is denoted in a general way by 5 and it consists usually of glass, celluloid, zylonite or some translucent substance usually of colored character which may be either ruby or emerald or any other desired shade. The shield 5 is so mounted, as to be movable into and out of active relation.

Said shield as shown is provided with a frame 6 and is so mounted that the frame can be swung either upwardly or laterally in such event to get a clear unobstructed vision through the windshield. As represented in Fig. 1, the glass or other translucent object 5 is in position to modify rays of an approaching automobile. As shown, the upper cross bar of the frame 6 has a lug 7 into which one end, the right, as shown in Fig. 1 is seated a conical bearing member 8, at the end of a spindle 9 which as shown is threaded through one of the arms of a yoke or carrier 10. The spindle 9 has upon it a check nut 11 which is intended to bear against the adjacent arm or branch of the yoke or carrier 10. In line with the conical bearing member 8 is a bearing member as 13 which is held in its seat in the lug 7 by a spindle 14 threaded through the adjacent branch of the yoke 10 and carrying upon it a check nut 15. This provides a construction for frictionally holding the frame 6 down in operative relation as represented in Fig. 1.

The yoke or carrier 10 as shown has midway of the upper side of its cross bar the lug 16 through which is extended the bolt 17, the bolt extending also through the ears of the clamp 18 which is adapted to detachably hug the upper cross bar of the windshield frame 2. This clamp may be removed from the upper cross bar and applied to a side bar of the windshield.

The bolt 17 has between its ends, the conical portion 19 which fits a conical seat at the back of the opening in the lug 16 through which the bolt 17 extends, this conical portion 19 being complemental to a nut 20, on the threaded forward portion of the bolt 17. By tightening up the nut 20, the nut and the conical portion 19 between them will jointly maintain the carrier 10 in a position of adjustment longitudinally of the upper cross bar or the side bar of the frame of the windshield. Normally, the nut 20 is set, and the frame 6 is merely operated to put its glass or other translucent member 5 into or out of working relation.

It will be, of course, apparent that the light shield 5 effectually filters the oncoming rays of a lamp and which is highly advantageous when such lamp is carried upon the front of an automobile. This filtration of the rays, I find has the effect of eliminating altogether collisions between automobiles.

What I claim is:

A light shield for an automobile, comprising a translucent sheet, a surrounding frame, said frame having an upstanding lug, conical members fitted in the ends of the lug, a yoke between which the lug is fitted, threaded members through the branches of the yoke and in connection with said conical members, a clamp to be attached to the frame of the windshield of an automobile, and a bolt extending through said yoke, furnished with means for clampng the same.

In testimony whereof I hereby affix my signature.

WALTER OLCOTT.

Witnesses:
ELIN C. CARDELL,
HEATH SUTHERLAND.